United States Patent [19]

Zelenz

[11] Patent Number: 4,590,519

[45] Date of Patent: May 20, 1986

[54] TELEVISION SIGNAL SCRAMBLING/DESCRAMBLING SYSTEM

[75] Inventor: Martin L. Zelenz, Manlius, N.Y.

[73] Assignee: Regency Electronics, Inc., Indianapolis, Ind.

[21] Appl. No.: 491,416

[22] Filed: May 4, 1983

[51] Int. Cl.⁴ .................................... H04N 7/167
[52] U.S. Cl. .................................. 358/120; 358/123
[58] Field of Search .................. 358/120, 123, 124

[56] References Cited

U.S. PATENT DOCUMENTS

| | | | |
|---|---|---|---|
| 3,081,376 | 3/1963 | Loughlin et al. | 358/120 |
| 3,439,113 | 4/1969 | Walker | 358/120 |
| 3,478,166 | 11/1969 | Reiter et al. | 358/120 |
| 3,729,576 | 4/1973 | Court | 358/120 |
| 3,824,332 | 7/1974 | Horowitz | 358/120 |
| 4,024,575 | 5/1977 | Harney et al. | 358/118 |
| 4,091,417 | 5/1978 | Nieson | 358/117 |
| 4,130,833 | 12/1978 | Chomet | 358/122 |
| 4,222,068 | 9/1980 | Thompson | 358/120 |
| 4,336,553 | 6/1982 | denToonder et al. | 358/120 |
| 4,454,543 | 6/1984 | Lund et al. | 358/123 |

FOREIGN PATENT DOCUMENTS 841627 7/1960 United Kingdom ............ 358/124

OTHER PUBLICATIONS

D. Landfear, "Build this Pay-TV Decoder", *Radio Electronics*, Jan. 1981.
1982 NCTA advertising flyer, "Introducing Z—TAC ™, Zenith's Tiered, Addressable Converter System".

*Primary Examiner*—S. C. Buczinski
*Assistant Examiner*—Linda J. Wallace
*Attorney, Agent, or Firm*—Woodard, Weikart, Emhardt & Naughton

[57] ABSTRACT

An in-band television signal sync suppression scrambling system has two sync suppression modes which are aperiodically alternated. Horizontal and vertical synchronizing pulses are equally suppressed in one mode, and are suppressed to different levels in a dual modulus mode. In single modulus mode, horizontal and vertical sync pulses are both suppressed at 6 dB. In the dual modulus mode, sync suppression is dynamically shifted between 10 db suppression for horizontal sync pulses and 6 db for the vertical interval. Mode control data is conveyed on the audio carrier and is detected by decoding circuitry which enables the restoration of synchronization pulses in the scrambled television signal according to the mode indicated. Mode changes are aperiodically changed depending upon the scene content in the TV picture or a random generator. The system provides synchronized mode transitions by which data corresponding to an upcoming mode is transmitted a predetermined number of TV video fields prior to the transition by the head-end encoder to the new mode.

24 Claims, 3 Drawing Figures

TELEVISION SIGNAL SCRAMBLING/DESCRAMBLING SYSTEM

BACKGROUND OF THE INVENTION

The present invention relates to scrambling and descrambling of cable television signals. A number of different scrambling methods have been employed in the past to prevent unauthorized reception of premium cable television programs for which a charge is usually imposed. Some systems incorporate subscriber addressing in which data is transmitted from a head-end scrambler to individual subscriber units. Upon proper address identification, descrambling circuitry is activated to enable reception of the authorized programming. However, many of the systems in use today are either too easily defeated or use overly complex scrambling techniques some of which introduce spurious and undesirable signals into the television signal. A need exists for a system which offers simplicity of design and yet increased security over existing systems.

SUMMARY OF THE INVENTION

The present invention relates to a novel television signal scrambling system which is both simple in scheme and sophisticated in the nature of security it provides. In one embodiment, scrambling is achieved by use of two sync suppression modes with one mode including dynamic shifting between two levels of sync suppression within a single TV video field. In a first, single modulus, mode the horizontal and vertical synchronizing pulses are suppressed by 6 db. In a second, dual modulus, mode the horizontal sync pulses are suppressed an additional 4 db while the vertical interval suppression remains at 6 db. The modes of scrambling are Intermittently altered and a control signal is applied to the scrambled television signal. This control signal is detected by decoding circuitry which enables the restoration of synchronization pulses in the scrambled television signal according to the mode indicated. In one method of mode switching, the modes are intermittently changed according to the scene content (picture brightness level) in the TV picture. By another described method, scrambling modes are intermittently altered under control of a random signal generator. Synchronization of the mode transitions between the head-end encoder and the descrambling units is also provided herein. Data corresponding to an upcoming mode transition is transmitted a predetermined number of TV video fields prior to the transition to the new mode by the head-end encoder. If the data is accurately received by a decoder, the decoder switches to the new mode simultaneously with the encoder. Otherwise, the decoder switches to the new mode as soon as valid data is received for a predetermined number of fields.

As will become apparent, there is herein provided a scrambling system which yields effective scrambling even under certain "white scene" conditions, and minimizes the vulnerability to tampering or unauthorized reception by means of "black box" descramblers.

DESCRIPTION OF THE PREFERRED EMBODIMENT

Figure 1:
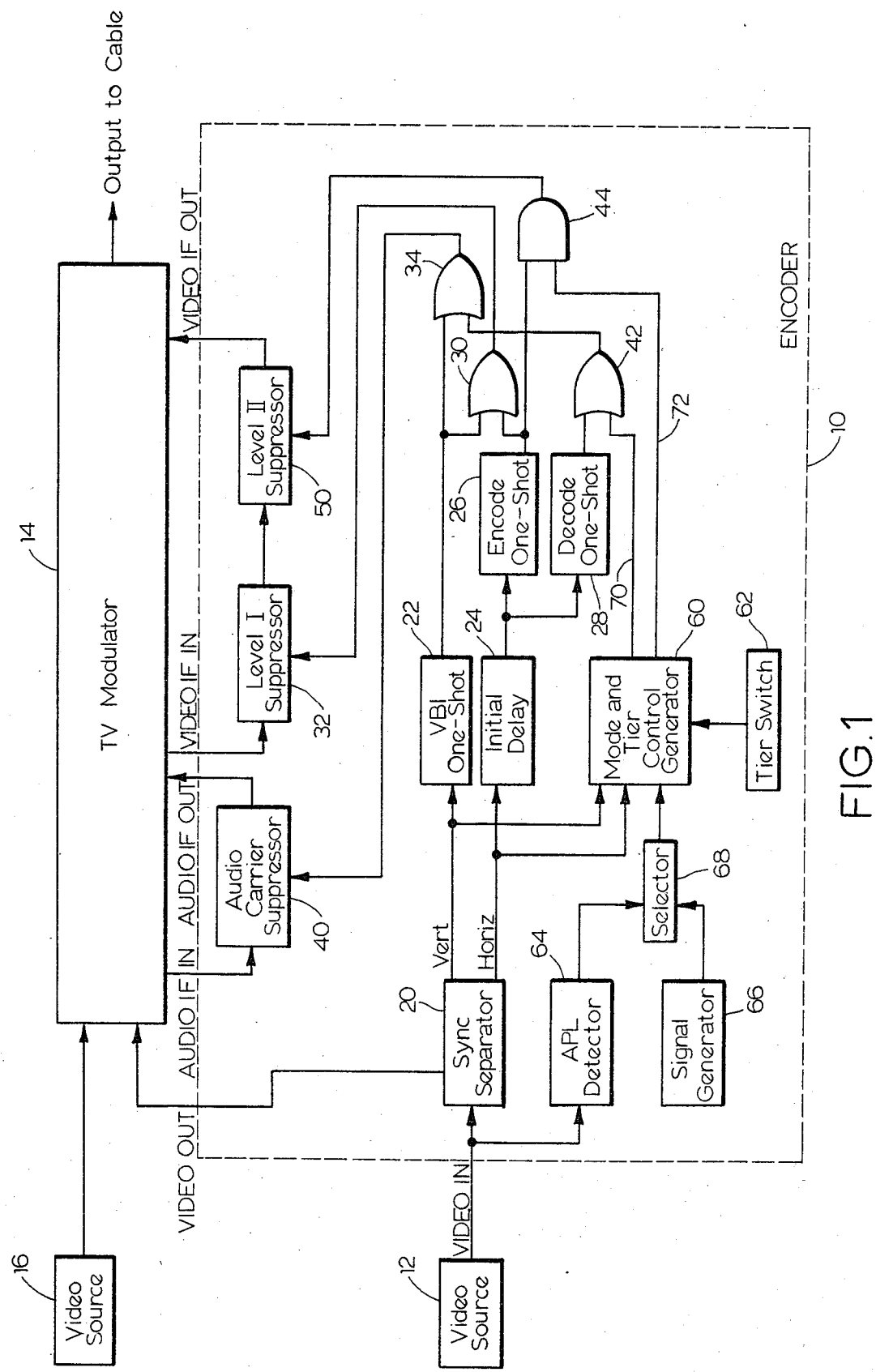
FIG. 1 is a block diagram of an encoder according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, the preferred embodiment of an encoder according to the present invention is depicted generally at 10. The general operation of encoder 10 may be described as follows. Encoder 10 receives a video signal input from video source 12 on the VIDEO IN line, as well as audio and video intermediate frequency (IF) signals from TV modulator 14. The audio IF signal is received on the AUDIO IF IN line, and the video IF signal is received on the VIDEO IF IN line. TV modulator 14 is adapted to receive a composite television signal having audio and video portions. Audio source 16 supplies lhe audio portion to TV modulator 14, and the video portion is received from video source 12 after first passing through encoder 10, as will be described. Encoder 10 suppresses synchronizing (sync) pulses in the video IF signal by a desired amount and applies timing pulses corresponding to those sync pulses to the audio IF signal. Encoder 10 also generates data corresponding to the mode of scrambling and applies that data to the audio IF signal as well. The resulting audio and video signals are supplied to TV modulator 14 on the AUDIO IF OUT and VIDEO IF OUT lines, respectively, and after further modulation and amplification, a radio frequency (RF) composite television signal is supplied on line 18 to the cable (not shown) for transmission to individual cable subscribers.

With continuing reference to FIG. 1, encoder 10 will now be described in more detail. The video signal received from video source 12 is a base band (unmodulated) video signal including the video detail information, blanking voltages, and horizontal and vertical synchronizing pulses. In conventional fashion the picture is transmitted in frames, each frame including two fields separated by vertical blanking intervals, each line of each field having one horizontal synchronizing pulse. The base band video signal input is looped through sync separator 20 and then sent to TV modulator 14 on the VIDEO OUT line of encoder 10. Sync separator 20 separates the sync pulses of the video wave from the other portions of the signal. preferably sync separator 20 has a high input impedance such that its loading effect on the video signal is negligible. The output pulses on the HORIZ line are generated coincident with the initiation of the individual horizontal blanking intervals. Each sync pulse on the VERT line begins at the initiation of the vertical blanking interval. The vertical sync pulses are coupled to vertical blanking interval (VBI) one-shot 22 which generates an output pulse beginning with the leading edge of the vertical sync pulse received on the VERT line and continuing for a time corresponding to 21 horizontal lines. The horizontal sync pulses are coupled along the HORIZ line to initial delay 24 which generates an output pulse for each incoming horizontal sync pulse. Initial delay 24, a variable one-shot, is provided to delay triggering of encode one-shot 26 and decode one-shot 28 by approximately 100 nanoseconds to 2 microseconds. This delay is desirable in order to precompensate for the delays which are inherent in the video modulation circuitry in TV modulator 14, that is, between the VIDEO OUT output and the VIDEO IF IN input of encoder 10. Modulators employing a surface acoustic wave (SAW) filter exhibit delays in the order of 2 microseconds, whereas modulators which use conventional IF lumped element circuitry exhibit delays of several hundred nanoseconds, it is preferable that delay 24 be adjustable. The output pulse from initial delay 24, is coupled to both encode one-shot 26 and decode one-shot 28. Encode one-shot 26 responds to the trailing edge of the output pulse from initial delay 24 by generating a pulse having a duration of twelve microseconds, which is the duration of the suppression for the horizontal sync pulses. Decode one-shot 28 also produces a pulse for each incoming pulse from initial delay 24, except that one-shot 28 includes an additional delay corresponding to nearly a full line of the picture such that output pulses from one-shot 28 occur a nominal two microseconds before the pulses from encode one-shot 26. The output pulses from decode one-shot 28 are advanced with respect to those of encode one-shot 26 in order to precompensate for a delay in the decoder of approximately two microseconds, as will be described.

The output pulses from VBI one-shot 22, encode one-shot 26 and decode one-shot 28 are all logical "1" (HIGH) pulses. Thus, it will be appreciated that the output pulses from one-shot 22 and one-shot 26 are separately coupled through OR gate 30 to Level I suppressor 32. Level I suppressor 32 is preferably arranged to provide controllable attenuation, such as with transistor or analog switch circuitry, such that when an output pulse is received from gate 30. the overall gain of suppressor 32 is reduced by 6 db. Due to the delays inherent in TV modulator 14, the timing of the input pulses to suppressor 32 matches that of the sync pulse portions of the video signal received at the VIDEO IF IN input to encoder 10 and suppressor 32. Thus, the 6 db of video carrier suppression is seen to affect both the horizontal and vertical blanking intervals but not the detail picture information in the video signal.

The output pulses from one-shot 22 are coupled to OR gate 34 and therethrough to audio carrier suppressor 40. Audio carrier suppressor 40 also receives the output pulses from decode one-shot 28 through OR gates 42 and 34. Audio carrier suppressor 40 provides amplitude shift keying whereby the horizontal and vertical pulses supplied by OR gate 34 modulate the audio carrier received on the AUDIO IF IN input to encoder 10 and suppressor 40, which carrier contains the FM sound signal. Since the output signal of decode one-shot 28 is advanced in phase with respect to the output of encode one-shot 26, suppressor 40 receives pulses corresponding to horizontal sync pulses before Level I suppressor 32. As a result of this timing difference the timing information contained on the audio carrier is transmitted in advance of the correspondingly suppressed portion of the video carrier.

The output from encode one-shot 26 is also coupled to one input of AND gate 44. When the other input to gate 44 is HIGH, the pulses from one-shot 26 are coupled through gate 44 to Level II suppressor 50 which receives the output signal from Level I suppressor 32. When activated, Level II suppressor 50 supplies an additional 4 db of attenuation to the video signal. Since AND gate 44 is used merely to gate the signals from one-shot 26 to suppressor 50 when Level II suppression is desired, and since the pulses produced by one-shot 26 correspond to horizontal sync pulses, it will be understood that suppressor 50 supplies additional attenuation to the horizontal sync pulses but not to the vertical blanking interval.

The function and operation of mode and tier control generator 60 will now be described. Control generator 60 controls the mode of scrambling in encoder 10, generates data corresponding to the scrambling mode for transmission on the audio carrier, and generates a digital data stream representing the tier selected by tier switch 62. Tier switch 62 is used to generate tier levels for purposes of channel identification. Such tier information is useful for control of the decoder to limit a subscriber to channels for which he has received prior authorization.

As can be seen from FIG. 1, control generator 60 receives the vertical and horizontal output pulses from sync separator 20 as well as an input from either average picture level (APL) detector 64 or signal generator 66 through selector. Selector 68 is provided to enable selection between suppression level switching modes, and, alternatively, may be a simple mechanical switch, or may provide for periodic or aperiodic switching between switching modes. Mode and tier control generator 60 uses the pulses received on the HORIZ line as clock pulses to control the timing of the transfer of tier information. Tier switch 62 is a binary-coded decimal (BCD) thumbwheel switch which supplies digital tier data to control generator 60, which data is then read out of control generator 60 in serial fashion under clock control. Control generator 60 includes a clock delay circuit which delays the clock pulses by approximately twenty microseconds for the purpose of separating the tier data from the sync pulse timing data which, as has already been described, is applied to the audio carrier. The first nine lines of each field of the picture are used for transmission of tier control information and, as will be described, scrambling mode information. One bit, approximately three microseconds in duration, is transmitted on each line, the first bit being a start bit and the following seven bits corresponding to the tier selected for the current program. The ninth bit, generated during the ninth line, corresponds to the scrambling mode. The digital data stream consisting of the nine bits just described is applied to OR gate 42 on line 70. The bits which are HIGH, when applied to the input of OR gate 42, are coupled therethrough to OR gate 34 through which they are coupled in like manner to audio carrier suppressor 40 as an additional modulation signal to be applied to the audio carrier.

The pulses supplied on the VERT line are used by control generator 60 as timing reference points for the generation of the tier control bits. Additionally, as will be described. these pulses are used as a strobe for an enable signal supplied to AND gate 44.

Average picture level (APL) detector 64 and random signal generator 66 provide alternate methods for determining when to effect a mode change. Selector 68 is provided to enable selection between detector 64 and generator 66. APL detector 64 determines the average picture level of the base band video signal supplied by video source 12. The output of APL detector 64 changes state when the average picture level of the video signal rises above a threshold of approximately 50% of the maximum signal level, and changes state again when the average picture level falls below a second threshold of approximately 40% of the maximum level. Hysteresis is provided to prevent excessive toggling between the two output states. When selector is set to the position corresponding to APL detector 64, the output signal of detector 64 is coupled to control generator 60 as a command to change the scrambling mode of the encoder and, correspondingly, the descrambling mode of the decoder.

Mode change command signals are alternatively provided by generator 66 which is preferably a random signal generator arranged to provide a change of state at a random time between 0.5 and 5 seconds after the previous change of state. Due to differences between particular decoders, slight differences in brightness can occur at mode changes. The range of times noted above has been found to provide a mean switching frequency which is neither so fast as to be perceptible by and annoying to authorized viewers nor so slow that unauthorized "pirate" viewers begin to see too much of the picture content. Alternatively, signal generator 66 may be a periodic signal generator such as a square wave or pulse generator.

The pulses supplied on the VERT line are used as a strobe to latch in mode control signals received from APL detector 64 or signal generator 66. When control generator 60 receives a vertical pulse on the VERT line, the current state of the mode control signal is latched into control generator 60 and applied on enable line 72 to AND gate 44 to either enable or disable that gate. As has been described, encoder 10 operates in the dual modulus suppression mode only when AND gate 44 is enabled. Using the pulses on the VERT line as strobe signals insures that switching between scrambling modes occurs during the vertical blanking interval, when no picture detail information is transmitted.

Control generator 60 preferably generates a mode control bit on line 70 for a new mode some predetermined number of fields before the scrambling mode is actually changed in encoder 10. The mode control bit, which is the ninth bit as has already been described, is fed by control generator 60 to audio carrier suppressor 40 through OR gates 42 and 34 during the first field following reception of a new mode control signal from APL detector 64 or signal generator 66. However, control generator 60 does not generate a new signal on enable line 72 until the predetermined number of fields are completed. As will be seen. the decoder is designed to receive nominally the same number of fields before changing the mode of sync restoration. This technique permits the decoder to receive several samples of the mode control bit for purposes of checking bit validity while still executing the transition to a new restoration mode in synchronization with the head-end signal scrambler.

Figure 2:
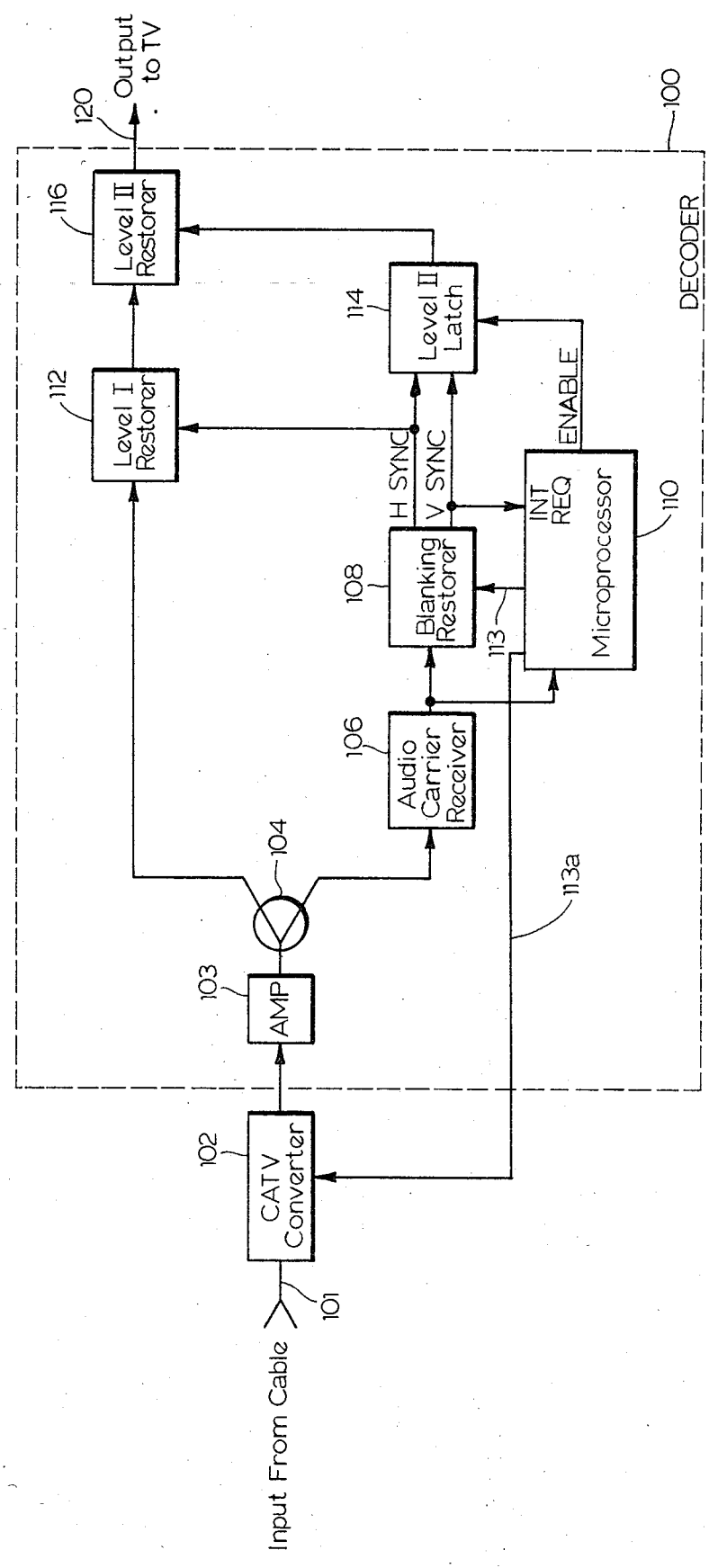
FIG. 2 is a block diagram of a decoder according to the present invention.

Referring now to FIG. 2, the operation of the decoder will now be described. The decoder according to the present invention is depicted generally at 100. The scrambled signal is received from the cable (not shown) on line 101. The signal is applied to CATV convertor 102 and tberefrom to decoder 100. CATV converter 102 is capable of receiving programs on many channels and of converting any specific channel frequency to a single, predetermined frequency corresponding to an unused channel in a given locality, which, for purposes of illustration, will be considered to be channel 3. As will be described, the subscriber has a limited ability to tune converter 102 to specific channels. The output of converter 102 is filtered in amp 103, a broadband amplifier tuned to channel 3 and including upper adjacent picture and lower adjacent sound traps. Hybrid splitter 104 divides the output signal from amp 103 into two isolated signals and couples one signal to audio carrier receiver 106. Audio carrier receiver 106, which advantageously includes filter circuitry tuned to the audio carrier frequency of channel 3, is designed to respond only to amplitude modulation on the audio carrier whereby the timing, tier and mode control bits applied to the audio carrier are detected. The detected data is sent to blanking restorer 108 and microprocessor 110.

Blanking restorer 108 responds to the timing information contained in the signal received from audio carrier receiver 106 but rejects the data portions of that signal. When enabled, pulse-stretching circuitry within blanking restorer 108 is triggered by pulses corresponding to horizontal synchronizing pulses, and restorer 108 produces output pulses ten microseconds in duration for restoration of the horizontal sync pulses. Because of delays inherent in the circuitry of receiver 106 and restorer 108, the horizontal output pulses of restorer 108 are synchronous with the originally suppressed horizontal sync pulses. Blanking restorer 108 also senses the absence of transmitted timing pulses which, since timing pulses are not applied to the audio carrier during the vertical interval, identifies the start of a vertical interval. If a timing pulse does not occur within the time of approximately one and a half lines, blanking restorer 108 generates a vertical synchronizing pulse on the V SYNC line having a duration equal to that of approximately twenty lines.

The H SYNC line signal is applied to Level I restorer 112 for restoration of the synchronizing pulses in the video signal. Level I restorer 112 receives a signal from splitter 104 having both audio and video components. Like suppressors 32 and 50 shown in FIG. 1, restorer 112 provides controllable attenuation to the carrier applied thereto. The gain switching circuitry is arranged so that the occurrence of a sync pulse applied to it causes the attenuation to be reduced by 6 db resulting in a relative increase in gain of 6 db for the portions of the signal corresponding to the sync pulses.

Microprocessor 110 receives the timing and control data from receiver 106, determines when a mode change has been requested, and produces an enable signal on the ENABLE line in that situation. Microprocessor 110 begins this process upon receipt at its INT REQ input of an interrupt request signal from blanking restorer 108. Since the V SYNC line signal is applied to the INT REQ input, it will be appreciated that the processor program begins to execute during each vertical interval. Microprocessor 110 then monitors the input signal from receiver 106 during defined time windows following each horizontal timing pulse and supplies an enable signal on line 113 to blanking restorer 108 if the tier level of the current program is one for which the subscriber is authorized. In addition to prevention of descrambling of the video by those not authorized, decoder 100 also prevents reception of the audio signal by an unauthorized party. This is accomplished by sending a momentary disable signal to converter 102 on line 113a to cause converter 102 to be automatically turned off or tuned to some other channel if the subscriber is not authorized to receive the selected channel. A subscriber may enable converter 102 after it is thus disabled by switching to another channel. Microprocessor 110 reexamines the tier level data corresponding to the current program after the channel is changed, and if the subscriber is authorized to receive the newly selected channel, converter 102 remains enabled.

Level II latch 114 responds to the signals on the H SYNC, V SYNC, and ENABLE lines to produce pulses and apply them to Level II restorer 116 during the appropriate times for Level II restoration of the horizontal sync pulses. Microprocessor 110 supplies an enable signal on the ENABLE line to latch 114 as soon as it determines that a valid command for a restoration mode change has been received. Since the timing of such an enable signal cannot be precisely determined, the V SYNC line signal is coupled to latch 114 to set the latch, and thereby cause a transition to Level II, during the vertical interval. Thereafter the pulses on the H SYNC line are gated through latch 114 to Level II restorer 116. Restorer 116, which has switching circuitry much like that of restorer 112, applies 4 db greater gain to the horizontal sync pulses than to the rest of the video signal. The descrambled video signal and the audio signal at the output of Level II restorer 116 are then supplied on output line 120 to the subscriber's television receiver. Switchover to single modulus mode is accomplished by interruption by microprocessor 110 of the enable signal on the ENABLE line. When a valid command for a transition to single modulus mode has been received, the ENABLE line is caused to change state. Latch 114 responds to the next vertical sync pulse on the V SYNC line by resetting and thereby decoupling the H SYNC line from the input to restorer 116. Thus, decoder 100 switches to single modulus restoration.

Figure 3:
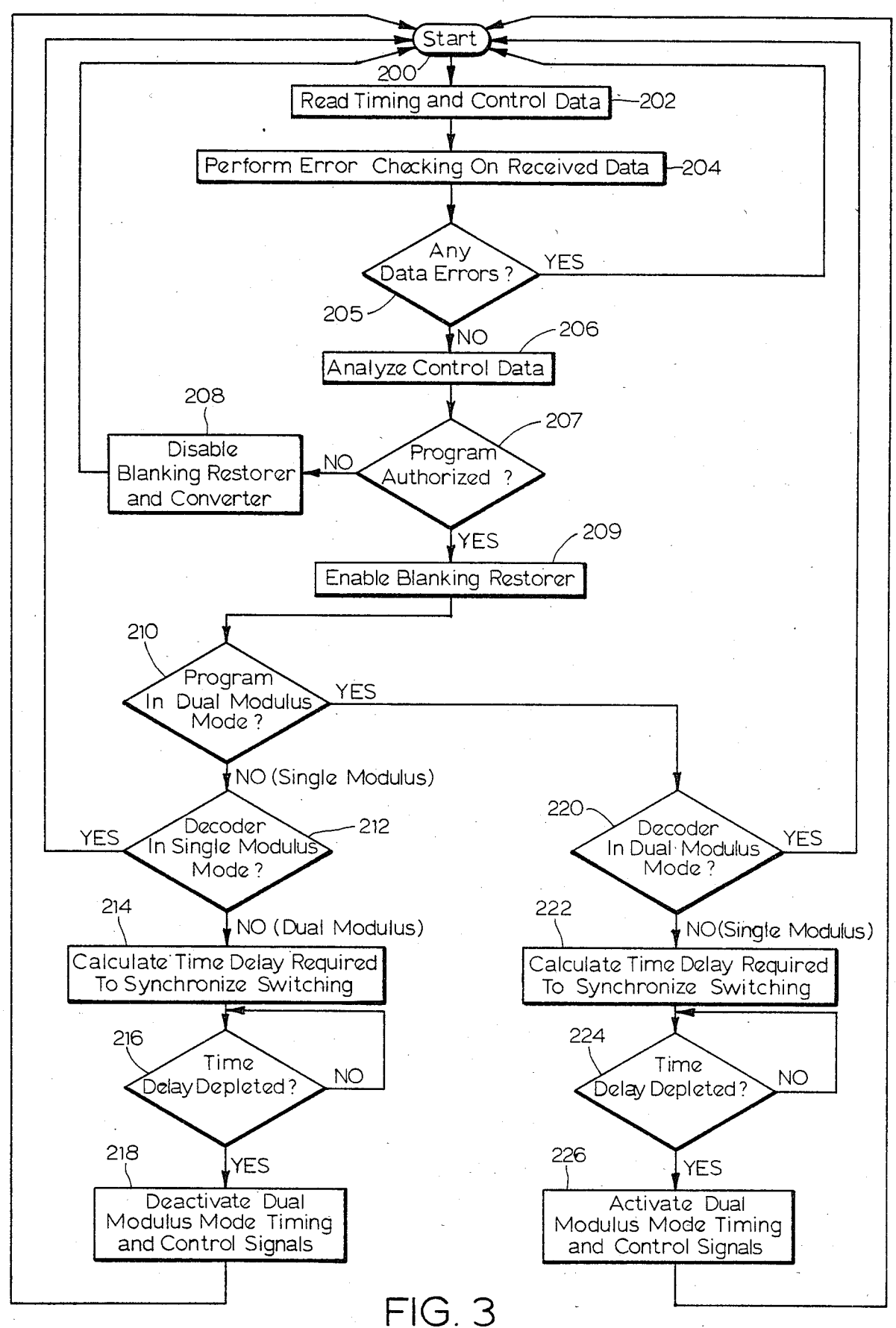
FIG. 3 is a flow chart of the steps performed by the microprocessor in the decoder of FIG. 2 for control of mode switching.

The function and operation of microprocessor 110, shown in FIG. 2, will be further understood with reference to the flow chart shown in FIG. 3. The flow chart illustrates the steps which are repetitively executed by microprocessor 110. Box 200 designates the start location for the program. The first step in the program shown in block 202, is to read timing and control data. This step includes reading data from a predetermined number of fields. After the data is read, the microprocessor performs error checking on the received data, as shown in block 204. The error checking involves checking for the presence of a start bit after the first horizontal timing pulse and checking the validity of the predetermined number of mode control bits. Program control then proceeds to decision block 205 wherein the processor determines whether there are any data errors. If the answer is yes, as in the case of either failure to receive a start bit or failure to receive valid mode control data, program control branches back to start block 200 in order to restart the data reading process. Data is repetitively read until the microprocessor determines that data has been correctly read in. The next step in the process, shown at block 206, is to analyze control data, which includes the verified mode control bit and the tier data. In decision block 207, the tied data is compared with internally stored tier data for the individual subscriber to determine whether the the subscriber is authorized to receive the present program. If not, the program step indicated at 208 causes generation of control signals to disable blanking restorer 108 and CATV converter 102 (shown in FIG. 2) and then returns program control to start block 200. If yes, the restorer is enabled, as indicated in block 209 (the CATV converter remains enabled), and in decision block 210, the program tests the mode control bit to determine the mode in which the upcoming program is scrambled. The program branches to the part of the flow chart shown generally at the right of FIG. 3 if the answer is yes. Continuing with the main flow direction of the flow chart, if the answer in decision block 210 is no, the indication is that the upcoming program is scrambled in single modulus mode. In that event, the program proceeds to decision block 212, where the question is asked whether the decoder circuitry is in single modulus mode. If yes, there is a match between the upcoming program suppression level and the present level of restoration in the decoder, and therefore no change in restoration level is warranted. The program branches back to the start block 200 and proceeds to read new data. If, however, the answer to the question in block 212 is no, then the decoder is operating in dual modulus mode when the upcoming suppression level is single modulus mode, and therefore it is necessary to make a level change. Block 214 designates the next step in the process, which is to calculate the time delay required to synchronize switching. The microprocessor will not cause a transition immediately after detection of a difference between present and upcoming levels of restoration. Instead it will wait until the next vertical blanking interval. This is the purpose of the time delay which is calculated in the step corresponding to block 214. The program then proceeds to a wait loop indicated as block 216 and its NO output which is returned to the input of the block. If the required time delay is not depleted, the program flow is out of the NO side of decision block 216 and back to the input of that block. If, however, the time delay has been depleted, the program proceeds to block 218 which designates the instruction to deactivate dual modulus mode timinq and control signals. The microprocessor's response to this instruction is to change the state of the signal on the ENABLE line shown and described with reference to FIG. 2. After this change in state is made, program control is returned to the start block 200 for reading of new data.

Returning to decision block 210, if the upcoming program will be scrambled in dual modulus mode, the answer is yes, and program flow is directed to another decision block, block 220. The question in this block is whether the decoder is presently set to descramble in dual modulus mode. If yes. there is no need for a level change, and program control returns to start block 200. The operations presented by blocks 222, 224, and 226 are similar to those described with reference to blocks 214, 216, and 218. If the decoder is not presently in dual modulus mode, the microprocessor calculates the time delay required to synchronize switching over to dual modulus mode, waits until the appropriate time has arrived, and then activates dual modulus mode timing and control signals. The ENABLE line is changed to reflect this activation.

While the invention has been illustrated and described in detail in the drawings and the foregoing description, the same is to be considered as illustrative anbd not restrictive in character, it being understood that only the preferred embodment has been shown and described and that all changes and modifications that come within the spirit of the invention are intended to be protected.

What is claimed is:

1. A system for scrambling and descrambling the video portions of composite television signals having audio and video portions, said system comprising:
   (a) an encoder, said encoder including
      (1) sync suppression means for scrambling a composite television signal by suppressing the amplitude of synchronization pulses in the video portion of the television signal, said suppression means being operative at a plurality of levels of suppression;
      (2) sync suppression level control means for intermittently changing the level of sync suppression at which said sync suppression means is operating; and
      (3) sync suppression level signal means for applying a control signal to the scrambled television signal, said control signal signifying an operating level of suppression of the synchronizing pulses of said sync suppression means; and
   (b) a decoder, said decoder including
      (1) sync restoration means for restoring synchronization pulses in the scrambled television signal scrambled by said encoder, said restoration means being operative at a plurality of levels of restoration, said plurality of levels of restoration corresponding to said plurality of levels of suppression of said sync suppression means;
      (2) control signal detection means for detecting the control signal applied to the composite television signal by said sync suppression level signal means; and
      (3) sync restoration control means for controlling the level of sync restoration at which said sync restoration means is operating, said sync restoration control means being responsive to the level of suppression signified by the detected control signal to selectively cause said sync restoration means to operate at a sync restoration level corresponding to the signified level of suppression.

2. The scrambling and descrambling system of claim 1 in which said sync suppression level control means includes means for changing the level of sync suppression at random intervals between 0.5 and 5 seconds in duration.

3. The scrambling and descrambling system of claim 1 in which said sync suppression level control means includes means for changing the level of sync suppression when (1) the average picture level of the composite television signal rises above a threshold of approximately 50% of the maximum signal level, and again when (2) the average picture level falls below a second threshold of approximately 40% of the maximum level.

4. The scrambling and descrambling system claim 1 in which said plurality of levels of suppression include 6 dB and 10 dB.

5. The scrambling and descrambling system of claim 1 in which said sync suppression means suppresses the amplitude of horizontal synchronizing pulses of the composite television signal.

6. The scrambling and descrambling system of claim 2 in which said sync suppression level control means includes means for changing the level of sync suppression when (1) the average picture level of the composite television signal rises above a threshold of approximately 50% of the maximum signal level, and again when (2) the average picture level falls below a second threshold of approximately 40% of the maximum level.

7. An encoder for scrambling the video portions of composite television signals having audio and video portions, said encoder comprising:
   (a) sync suppression means for scrambling a composite television signal by suppressing the amplitude of synchronization pulses in the video portion of the television signal, said suppression means being operative at a plurality of levels of suppression;
   (b) sync suppression level control means for intermittently changing the level of sync suppression at which said sync suppression means is operating; and
   (c) sync suppression level signal means for applying a control signal to the scrambled television signal, said control signal signifying an operating level of synchronization pulse suppression of said sync suppression means.

8. The encoder of claim 7 in which said plurality of levels of suppression include 6 dB and 10 dB.

9. The encoder of claim 8 in which said sync suppression means suppresses the amplitude of horizontal synchronizing pulses of the composite television signal.

10. The encoder of claim 9 in which said sync suppression level control means includes means for changing the level of sync suppression at random intervals between 0.5 and 5 seconds in duration.

11. The encoder of claim 10 in which said sync suppression level control means includes means for changing the level of sync suppression when (1) the average picture level of the composite television signal rises above a threshold of approximately 50% of the maximum signal level, and again when (2) the average picture level falls below a second threshold of approximately 40% of the maximum level.

12. A decoder for descrambling the video portions of a scrambled television signal having audio and video portions, said decoder comprising:
   (a) sync restoration means for restoring synchronization pulses in a scrambled television signal, the scrambled television signal having synchronization pulses of suppressed amplitude in the video portion of the television signal, said restoration means being operative at a plurality of levels of restoration;
   (b) control signal detection means for detecting a control signal applied to the composite television signal, said control signal signifying the level of suppression of the synchronizing pulses of the scrambled television signal; and
   (c) sync restoration control means for controlling the level of sync restoration at which said sync restoration means is operating, said sync restoration control means being responsive to the level of suppression signified by the detected control signal.

13. The decoder of claim 12 in which said plurality of levels of restoration include 6 dB and 10 dB.

14. The decoder of claim 13 in which said sync restoration means restores the amplitude of horizontal synchronizing pulses of the composite television signal.

15. A method for scrambling and descrambling the video portions of composite television signals having audio and video portions, said system comprising:
   (a) scrambling a composite television signal by suppressing the amplitude of synchronization pulses in the video portion of the television signal at a level of suppression;
   (b) intermittently changing the level of sync suppression;

(c) applying a control signal to the scrambled television signal, the control signal signifying the level of suppression of the synchronizing pulses of scrambling of the television signal;

(2) detecting the control signal applied to the scrambled television signal; and (d) restoring synchronization pulses in the scrambled television signal scrambled by said encoder at a sync restoration level corresponding to the level of suppression signified by the detected control signal.

16. A system for scrambling and descrambling television signals having horizontal and vertical synchronizing pulses, said system comprising:

(a) an encoder, said encoder including
  (1) first sync suppression means for scrambling a composite television signal by suppressing the amplitude of both the horizontal and the vertical synchronization pulses in the video portion of the television signal at the same level of suppression;
  (2) second sync suppression means for scrambling a composite television signal by suppressing the amplitude of the horizontal and vertical synchronization pulses in the video portion of the television signal at differing levels of suppression;
  (3) means for intermittently alternating the modes of scrambling the television signal between
    (i) a first mode in which said first sync suppression means is activated, and
    (ii) a second mode in which said second sync suppression means is activated; and
  (4) mode signal means for applying a control signal to the scrambled television signal, said control signal signifying an operating mode of scrambling; and (b) a decoder, said decoder including:
  (1) first sync amplifying means for descrambling a composite television signal by amplifying both the horizontal and the vertical synchronization pulses in the video portion of the television signal by the same amplification factors;
  (2) second sync amplifying means for descrambling a composite television signal by amplifying the horizontal and vertical synchronization pulses in the video portion of the television signal by differing amplification factors;
  (3) control signal detection means for detecting control signals applied to the composite television signal; and
  (4) sync restoration control means for alternating the modes of descrambling the television signal between
    (i) a first mode in which said first sync amplifying means is activated, and
    (ii) a second mode in which said second sync amplifying means is activated;
  said sync restoration control means being responsive to control signals detected by said control signal detection means.

17. The scrambling and descrambling system of claim 16 in which said intermittent alternating mean includes means for changing the level of sync suppression at random intervals between 0.5 and 5 seconds in duration.

18. The scrambling and descrambling system of claim 17 in which said intermittent alternating means includes means for changing the scrambling mode when (1) the average picture level of the composite television signal rises above a threshold of approximately 50% of the maximum signal level, and again when (2) the average picture level falls below a second threshold of approximately 40% of the maximum level.

19. An encoder for scrambling a television signal having horizontal and vertical synchronizing pulses in its video portion, said encoder comprising:

(a) first sync suppression means for scrambling a composite television signal by suppressing the amplitude of both the horizontal and the vertical synchronization pulses in the video portion of the television signal at the same level of suppression;

(b) second sync suppression means for scrambling a composite television signal by suppressing the amplitude of the horizontal and vertical synchronization pulses in the video portion of the television signal at differing levels of suppression;

(c) means for intermittently alternating the modes of scrambling the television signal between
  (1) a first mode in which said first sync suppression means is activated, and
  (2) a second mode in which said second sync suppression means is activated; and (d) mode signal means for applying a control signal to the scrambled television signal, said control signal signifying an operating mode of scrambling.

20. The encoder of claim 19 in which said intermittent alternating means includes means for changing the scrambling mode when (1) the average picture level of the composite television signal rises above a threshold of approximately 50% of the maximum signal level, and again when (2) the average picture level falls below a second threshold of approximately 40% of the maximum level.

21. The encoder of claim 20 in which said intermittent alternating means includes means for changing the level of sync suppression at random intervals between 0.5 and 5 seconds in duration.

22. A decoder for descrambling a scrambled television signal having horizontal and vertical synchronizing pulses in its video portion, said decoder comprising:

(a) first sync amplifying means for descrambling a composite television signal by amplifying both the horizontal and the vertical synchronization pulses in the video portion of the television signal by the same amplification factors;

(b) second sync amplifying means for descrambling a composite television signal by amplifying the horizontal and vertical synchronization pulses in the video portion of the television signal by differing amplification factors;

(c) control signal detection means for detecting control signals applied to the composite television signal; and (d) sync restoration control means for alternating the modes of descrambling the television signal between (1) a first mode in which said first sync amplifying means is activated, and (2) a second mode in which said second sync amplifying means is activated; said sync restoration control means being responsive to control signals detected by said control signal detection means.

23. A method for scrambling and descrambling television signals having horizontal and vertical synchronizing pulses, said method comprising the steps of: scrambling a composite television signal by suppressing the amplitude of the horizontal synchronization pulses at a first level of suppression and suppressing the level of the vertical synchronization pulses at a second level of suppression; and restoring synchronization pulses in the scrambled television signal by restoring the amplitude of the horizontal synchronization pulses from said first level of suppression and restoring the level of the vertical synchronization pulses from said second level of suppression.

24. The method of claim 23 in which said first level of suppression is 10 dB and said second level of suppression is 6 dB.

* * * * *